US009988107B2

(12) United States Patent
Shimpo

(10) Patent No.: US 9,988,107 B2
(45) Date of Patent: Jun. 5, 2018

(54) VEHICLE REAR PORTION STRUCTURE

(71) Applicant: TOYOTA JIDOSHA KABUSHIKI KAISHA, Toyota-shi (JP)

(72) Inventor: Tomoyuki Shimpo, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 1 day.

(21) Appl. No.: 15/168,866

(22) Filed: May 31, 2016

(65) Prior Publication Data

US 2017/0029046 A1 Feb. 2, 2017

(30) Foreign Application Priority Data

Jul. 27, 2015 (JP) ................. 2015-148165

(51) Int. Cl.
*B62D 43/06* (2006.01)
*B62D 21/15* (2006.01)
*B62D 25/08* (2006.01)

(52) U.S. Cl.
CPC ........... *B62D 43/06* (2013.01); *B62D 21/152* (2013.01); *B62D 25/08* (2013.01)

(58) Field of Classification Search
CPC ...... B62D 43/06; B62D 21/152; B62D 25/08; B62D 25/087; B62D 25/20; B62D 25/2027; B62D 25/2072; B62D 43/10
(Continued)

(56) References Cited

U.S. PATENT DOCUMENTS 8,276,966 B2 * 10/2012 Souma ................. B62D 25/087
296/187.11
2006/0087156 A1 * 4/2006 Kobayashi ......... B62D 25/2027
296/203.01
(Continued)

FOREIGN PATENT DOCUMENTS

EP 1990261 A1 * 11/2008 ........... B62D 25/087
JP 2010202105 A * 9/2010 ........... B62D 21/152
(Continued)

OTHER PUBLICATIONS

Definition of "portion" from BING, 3 pages—http://www.bing.com/search?q=define%3A+portion&src=IE-SearchBox&FORM=IESR02 (Year: 2017).*

*Primary Examiner* — Hilary L Gutman
(74) *Attorney, Agent, or Firm* — Oblon, McClelland, Maier & Neustadt, L.L.P.

(57) ABSTRACT

A vehicle rear portion structure including: a spare tire house; a front side reinforcing portion provided at a bottom wall portion of the spare tire house, the front side reinforcing portion reinforcing the bottom wall portion and structuring a first high rigidity portion; a rear side reinforcing portion provided at the bottom wall portion so as to include a lower wall portion that extends in a vehicle longitudinal direction, the rear side reinforcing portion being disposed at a vehicle rear upper side of the front side reinforcing portion, reinforcing the bottom wall portion, and structuring a second high rigidity portion, and a low rigidity portion provided between the first high rigidity portion and the second high rigidity portion, and a rigidity of the low rigidity portion being set to be lower than rigidities of the first high rigidity portion and the second high rigidity portion.

3 Claims, 7 Drawing Sheets

(58) Field of Classification Search
USPC .................................................. 296/187.11
See application file for complete search history.

(56) References Cited

U.S. PATENT DOCUMENTS

| | | | | |
|---|---|---|---|---|
| 2008/0203767 A1* | 8/2008 | Cox | ..................... | B62D 43/045 296/204 |
| 2009/0195030 A1* | 8/2009 | Yamaguchi | .......... | B62D 21/152 296/193.08 |
| 2009/0195032 A1* | 8/2009 | Yamaguchi | ........ | B62D 25/2027 296/203.04 |
| 2009/0278384 A1* | 11/2009 | Yamada | ............... | B62D 21/152 296/187.11 |
| 2011/0121597 A1* | 5/2011 | Asou | .................... | B62D 21/152 296/37.2 |
| 2011/0121613 A1* | 5/2011 | Souma | ................ | B62D 21/152 296/203.04 |
| 2011/0155772 A1* | 6/2011 | Souma | ................... | B62D 43/10 224/42.12 |
| 2011/0156431 A1* | 6/2011 | Souma | ................ | B62D 21/152 296/37.2 |
| 2011/0227367 A1* | 9/2011 | Funakoshi | ........... | B62D 25/087 296/187.11 |
| 2015/0084376 A1* | 3/2015 | Shigihara | ............... | B62D 43/10 296/193.07 |
| 2017/0158263 A1* | 6/2017 | Kojo | ..................... | B62D 43/10 |

FOREIGN PATENT DOCUMENTS

| | | | |
|---|---|---|---|
| JP | 2011-111025 | 6/2011 | |
| JP | 2011-131711 | 7/2011 | |
| JP | 2011-131712 | 7/2011 | |
| JP | 2013-116706 | 6/2013 | |
| JP | 2014-8835 | 1/2014 | |
| WO | WO 2015033374 A1 * | 3/2015 | ........... B62D 25/087 |

* cited by examiner

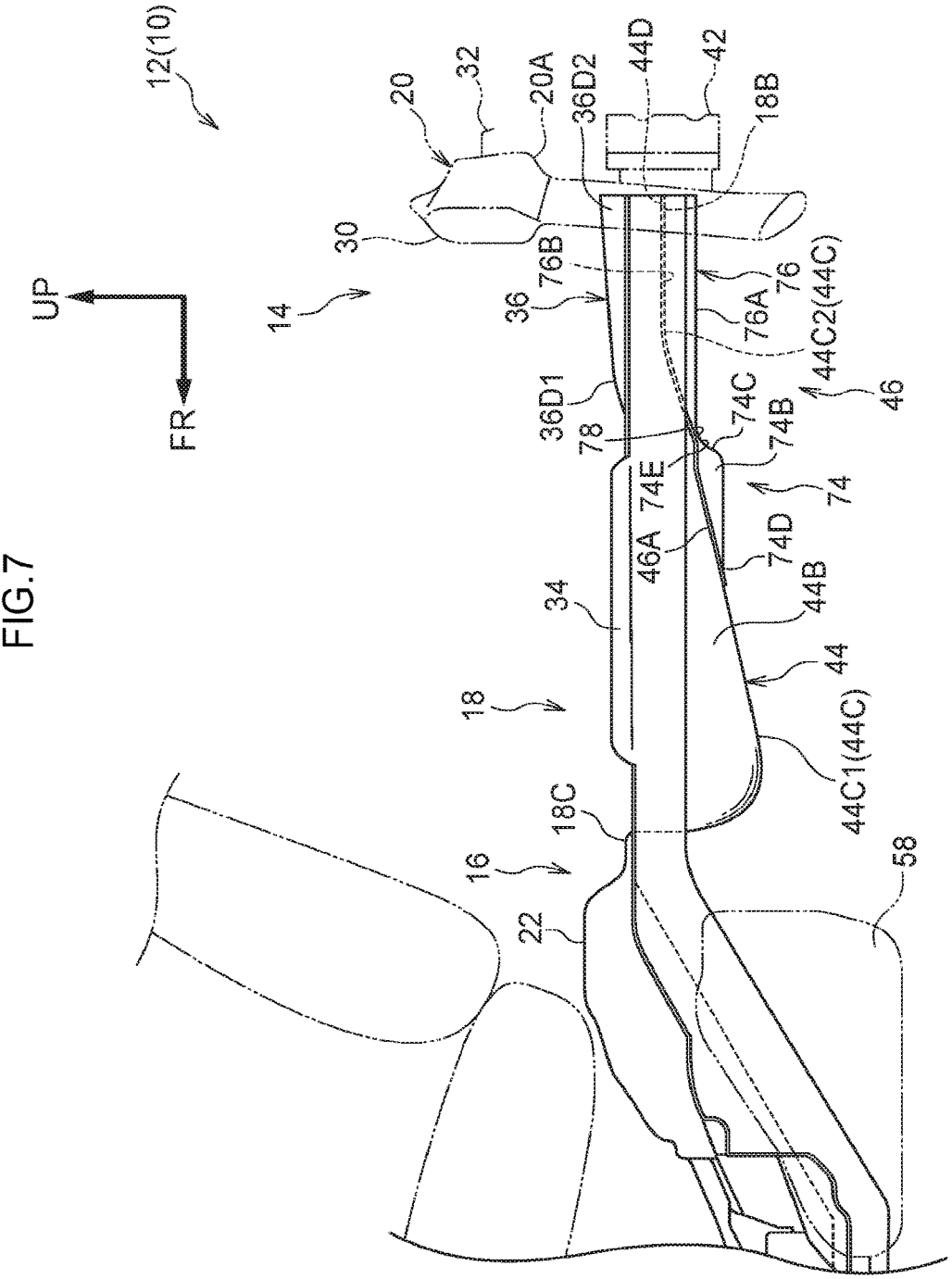

VEHICLE REAR PORTION STRUCTURE

CROSS-REFERENCE TO RELATED APPLICATION

This application is based on and claims priority under 35 USC 119 from Japanese Patent Application No. 2015-148165 filed on Jul. 27, 2015, the disclosure of which is incorporated by reference herein.

BACKGROUND

Technical Field

The present invention relates to a vehicle rear portion structure.

Related Art

Japanese Patent Application Laid-Open (JP-A) No. 2011-111025 discloses an invention relating to a lower portion structure of a vehicle body rear portion. In this lower portion structure of a vehicle body rear portion, a pair of side frames that extend in the vehicle longitudinal direction are disposed at the peripheral edge portions at the both vehicle transverse direction sides of a rear floor in which a spare tire house is formed. The side frames are divided into frame front portions and frame rear portions, and the frame front portions have higher rigidities than the frame rear portions. On the other hand, a hook reinforcing member that extends in the vehicle longitudinal direction is disposed at the vehicle transverse direction central portion of the lower surface portion of the spare tire house. This hook reinforcing member is divided into a reinforcing member front portion and a reinforcing member rear portion, at the same position as the divided positions of the side frames as seen in the vehicle vertical direction, and the reinforcing member rear portion has a higher rigidity than the reinforcing member front portion. Further, the spare tire that is accommodated in the spare tire house is disposed in a tilted state in which the vehicle rear side portion thereof is disposed further toward the vehicle upper side than the vehicle front side portion thereof. Therefore, when collision load is inputted to the vehicle rear portion, the side frames and the hook reinforcing member, at the respective divided positions thereof, bendingly deform so as to become convex toward the vehicle lower side, and, accompanying this, the rear floor, and accordingly the spare tire house, deforms. When the spare tire house deforms, the spare tire is thrown up while pivoting toward the vehicle front side around the vehicle front side portion of the spare tire. As a result, the transmission of load to the vehicle front side by the spare tire can be suppressed.

However, in the case of this related art disclosed in JP-A No. 2011-111025, the frame front portions are disposed rectilinearly along the vehicle longitudinal direction with respect to the frame rear portions, and the reinforcing member front portion is disposed rectilinearly along the vehicle longitudinal direction with respect to the reinforcing member rear portion, and it is thought that the direction of the bending deformation at the time of input of the collision load is not stable. Therefore, there is room for improvement with regard to throwing a spare tire up stably at the time of input of collision load.

SUMMARY

In view of the above-described circumstances, an object of the present invention is to provide a vehicle rear portion structure that can stably throw a spare tire up at the time of input of collision load to a vehicle rear portion, and can suppress transmission of load toward the vehicle front side by the spare tire.

A vehicle rear portion structure relating to a first aspect of the present invention includes a spare tire house, the spare tire house being formed at a rear floor panel that structuring a vehicle body rear portion, and in the spare tire house a spare tire being accommodated; a front side reinforcing portion, the front side reinforcing portion being provided at a bottom wall portion of the spare tire house, the front side reinforcing portion reinforcing the bottom wall portion, and the front side reinforcing portion structuring a first high rigidity portion; a rear side reinforcing portion, the rear side reinforcing portion being provided at the bottom wall portion so as to include a lower wall portion that extends in a vehicle longitudinal direction, the rear side reinforcing portion being disposed at a vehicle rear upper side of the front side reinforcing portion, and the rear side reinforcing portion reinforcing the bottom wall portion, and that structures a second high rigidity portion, and a low rigidity portion, the low rigidity portion being provided between the first high rigidity portion and the second high rigidity portion, and a rigidity of the rigidity portion being set to be lower than rigidities of the first high rigidity portion and the second high rigidity portion.

In accordance with the first aspect of the present invention, the spare tire house is formed at the rear floor panel that structures the vehicle body rear portion, and a spare tire is accommodated in this spare tire house. Therefore, when collision load is inputted to the vehicle rear portion, this collision load is inputted to the rear floor panel that structures the vehicle body rear portion, and accordingly to the spare tire house that is formed at the rear floor panel, and the collision load is transmitted via the spare tire house to the spare tire as well.

By the way, when the collision load that is inputted to the vehicle rear portion is large, the rear floor panel deforms, and, accompanying the deformation of the rear floor panel, the spare tire house also deforms. Further, it is thought that, due to the spare tire house deforming, the spare tire moves toward the vehicle front side.

Here, in the present invention, the front side reinforcing portion and the rear side reinforcing portion are provided at the bottom wall portion of the spare tire house. The first high rigidity portion is structured due to the bottom wall portion being reinforced by the front side reinforcing portion, and the second high rigidity portion is structured due to the bottom wall portion being reinforced by the rear side reinforcing portion. Further, the low rigidity portion, whose rigidity is set to be lower than those of the first high rigidity portion and the second high rigidity portion, is provided between the first high rigidity portion and the second high rigidity portion. Therefore, when collision load from the vehicle rear side is inputted to the spare tire house, the second high rigidity portion and the peripheral portion of the second high rigidity portion at the spare tire house are pushed toward the vehicle front side while the shapes thereof are substantially maintained. Further, the spare tire house bendingly deforms with the low rigidity portion, that is provided between the first high rigidity portion and the second high rigidity portion, being the starting point.

By the way, it is thought that, when the first high rigidity portion and the second high rigidity portion are disposed rectilinearly along the vehicle longitudinal direction, the direction of the bending deformation of the spare tire house is unstable. Here, in the present invention, the rear side reinforcing portion is structured to include the lower wall portion that extends in the vehicle longitudinal direction, and the rear side reinforcing portion is disposed at the vehicle rear upper side of the front side reinforcing portion, and the second high rigidity portion is structured at the vehicle rear upper side of the first high rigidity portion. Therefore, the second high rigidity portion is pushed toward the vehicle front side by the vehicle longitudinal direction component of the collision load from the vehicle rear side, and the first high rigidity portion pivots in a direction of rising-up toward the vehicle front side. As a result, even if a load component in the vehicle vertical direction is included in the collision load that is inputted to the vehicle rear portion, the spare tire house bendingly deforms so as to become convex toward the vehicle upper side with the low rigidity portion being the apex, and the spare tire is thrown up due to the spare tire house bendingly deforming.

In a vehicle rear portion structure relating to a second aspect of the present invention, in the first aspect, the rear side reinforcing portion extends to a vehicle rear side end portion of the spare tire house, and a vehicle rear side end portion of the rear side reinforcing portion is positioned further toward a vehicle rear side than vehicle rear side end portions of rear side members that extend along peripheral edge portions of vehicle transverse direction both sides of the rear floor panel.

In accordance with the second aspect of the present invention, the rear side reinforcing portion extends to the vehicle rear side end portion of the spare tire house. Further, the vehicle rear side end portion of the rear side reinforcing portion is positioned further toward the vehicle rear side than the vehicle rear side end portions of the rear side members that extend along the peripheral edge portions of the vehicle transverse direction both sides of the rear floor panel. Therefore, at the time of input of collision load from the vehicle rear side, the spare tire house can bendingly deform before the rear side members deform.

In a vehicle rear portion structure relating to a third aspect of the present invention, in the first or second aspect, a rear bumper reinforcement that extends in a vehicle transverse direction is disposed at a vehicle rear side of the rear side reinforcing portion, at a position that overlaps the rear side reinforcing portion as seen in the vehicle longitudinal direction.

In accordance with the third aspect of the present invention, the rear bumper reinforcement that extends in the vehicle transverse direction is disposed at the vehicle rear side of the rear side reinforcing portion, at a position that overlaps the rear side reinforcing portion as seen in the vehicle longitudinal direction. Therefore, the efficiency of transmitting the collision load, that is inputted from the vehicle rear side to the rear bumper reinforcement, to the rear side reinforcing portion can be improved.

In a vehicle rear portion structure relating to a fourth aspect of the present invention, in the invention of any one of the first through third aspects, the low rigidity portion is disposed at a vehicle rear side of a fixed position where the spare tire is fixed to the bottom wall portion.

In accordance with the fourth aspect of the present invention, because the low rigidity portion is disposed at the vehicle rear side of the fixed position where the spare tire is fixed to the bottom wall portion, the starting point of the deformation of the spare tire house is further toward the vehicle rear side than the fixed position of the spare tire. Therefore, at the time of input of collision load from the vehicle rear side, the spare tire is in a tilted state in which the vehicle rear side portion thereof is disposed further toward the vehicle upper side than the vehicle front side portion thereof. Further, at this time, the peripheral portion of the first high rigidity portion at the spare tire house pivots in a direction of rising-up toward the vehicle front side. Therefore, load, that causes the spare tire to pivot in a direction of rising-up toward the vehicle front side, is applied from that peripheral portion to the spare tire.

As described above, the vehicle rear portion structure relating to the first aspect of the present invention has the excellent effect of being able to, at the time of input of collision load to the vehicle rear portion, stably throw the spare tire up, and suppress the transmission of load to the vehicle front side by the spare tire.

The vehicle rear portion structure relating to the second aspect of the present invention has the excellent effect of being able to throw the spare tire up without being affected by deformation of the vehicle body rear portion, even in a vehicle in which the length of the rear side members cannot be ensured.

The vehicle rear portion structure relating to the third aspect of the present invention has the excellent effect of being able to shorten the time that is required from the input of collision load from the vehicle rear side to the throwing-up of the spare tire.

The vehicle rear portion structure relating to the fourth aspect of the present invention has the excellent effect of being able to suppress displacement of the spare tire toward a vehicle obliquely front upper side, by making the direction of tilting of the spare tire be directed toward the vehicle lower side. Further, this vehicle rear portion structure relating to the fourth aspect has the excellent effect of being able to shorten the time that is required from the input of collision load from the vehicle rear side to the throwing-up of the spare tire, as compared with a case in which the low rigidity portion is disposed at the vehicle front side of the fixed position where the spare tire is fixed to the bottom wall portion.

BRIEF DESCRIPTION OF THE DRAWINGS

Exemplary embodiments of the present invention will be described in detail based on the following figures, wherein:

FIG. 7 is a side view in which the vehicle rear portion, to which the vehicle rear portion structure relating to the present embodiment is applied, is viewed from the vehicle transverse direction.

DETAILED DESCRIPTION

An example of an embodiment of a vehicle rear portion structure relating to the present invention is described hereinafter by using FIG. 1 through FIG. 7. Note that arrow FR that is shown appropriately in the respective drawings indicates the vehicle front side, arrow UP indicates the vehicle upper side, and arrow R indicates the vehicle transverse direction right side.

Figure 5:
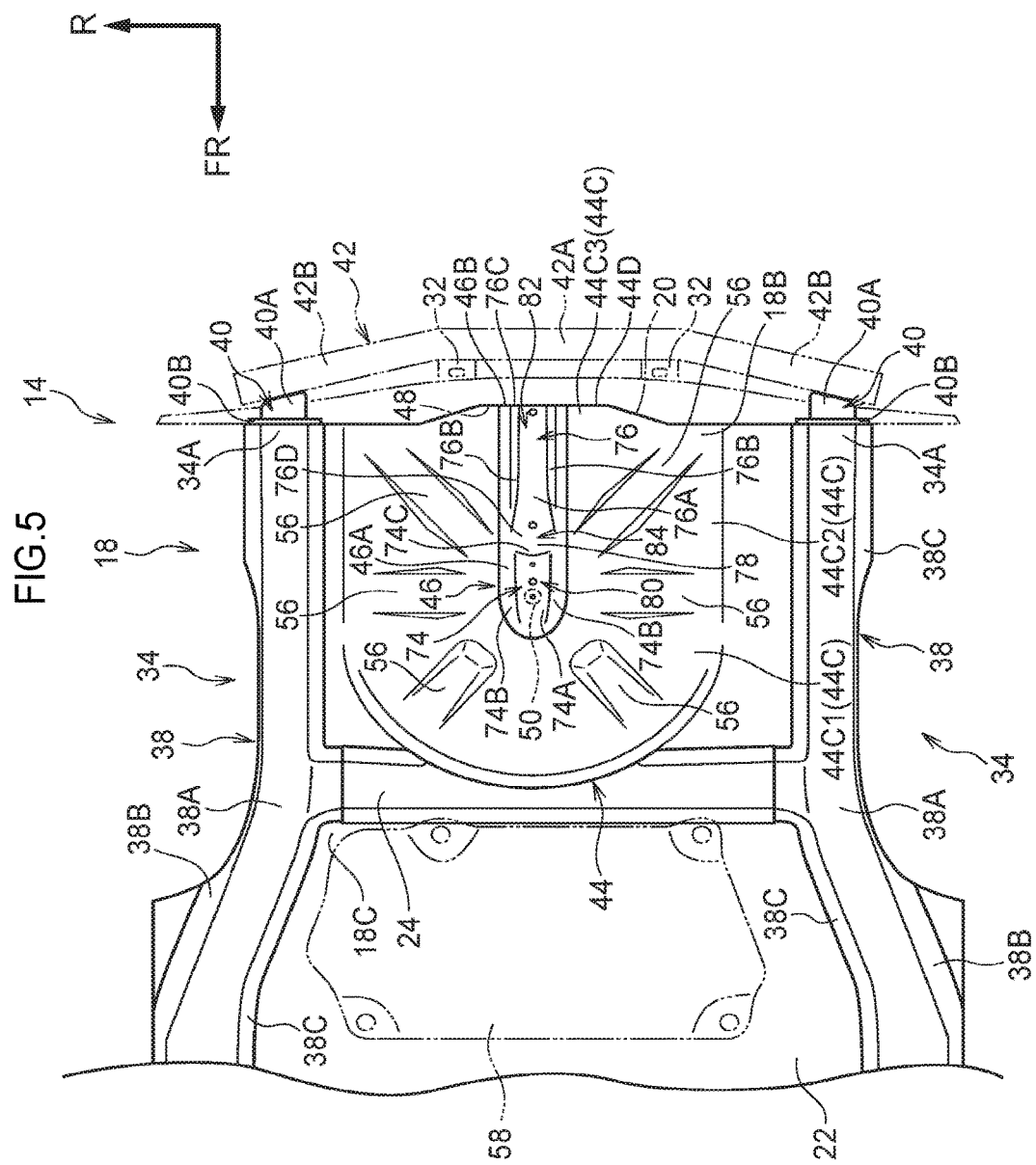
FIG. 5 is a bottom view in which the vehicle rear portion, to which the vehicle rear portion structure relating to the present embodiment is applied, is viewed from the vehicle lower side.
Figure 6:
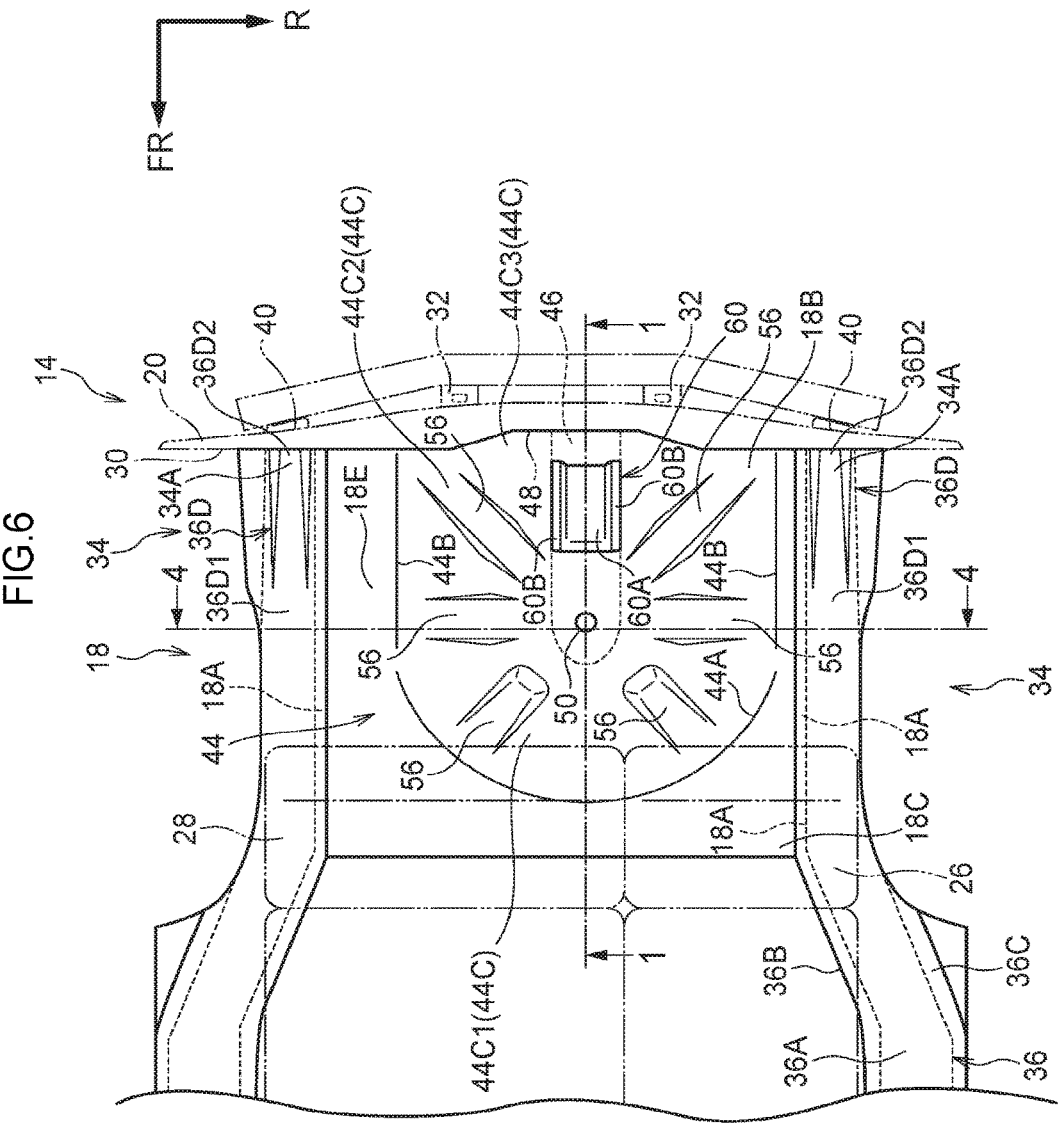
FIG. 6 is a top view in which the vehicle rear portion, to which the vehicle rear portion structure relating to the present embodiment is applied, is viewed from the vehicle upper side.

First, the overall structure of a vehicle body rear portion 14, that structures a vehicle rear portion 12 of a vehicle 10 to which the vehicle rear portion structure relating to the embodiment of the present invention is applied, is described. As shown in FIG. 5 through FIG. 7, the vehicle body rear portion 14 is structured to include a rear floor panel 18 that structures the vehicle rear side portion of a floor portion 16 of the vehicle 10 and that extends in the vehicle longitudinal direction and the vehicle transverse direction. This rear floor panel 18 is formed by press-working a steel plate. A spare tire house 44, that accommodates a spare tire 68 as will be described later, is provided at this rear floor panel 18. Further, at peripheral edge portions 18A that are at the vehicle transverse direction both sides of the rear floor panel 18, a pair of rear side members 34 extend along these peripheral edge portions 18A. A lower back panel 20 is provided at a peripheral edge portion 18B that is at the vehicle rear side of this rear floor panel 18.

Figure 1:
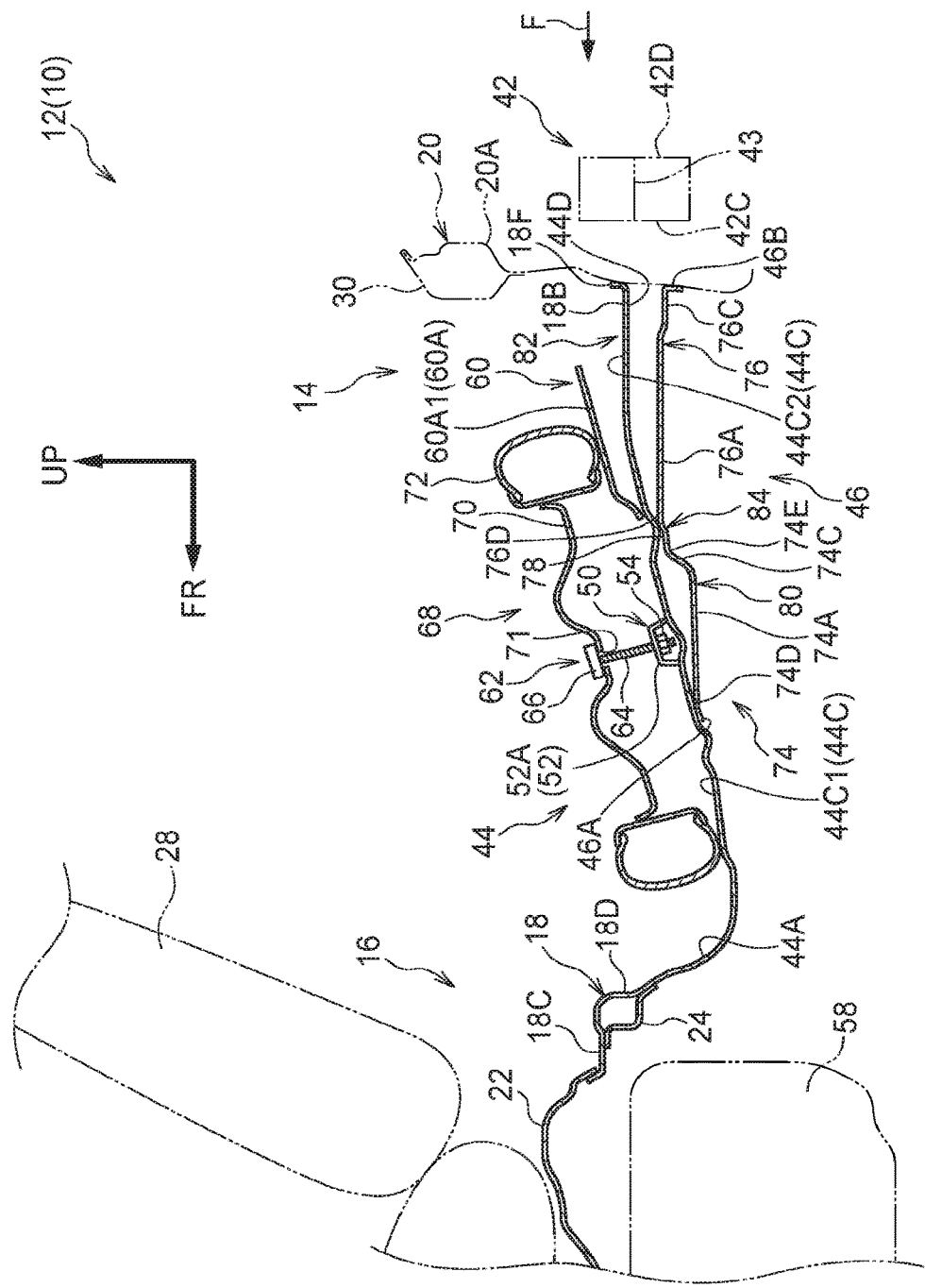
FIG. 1 is a cross-sectional view in which a vehicle rear portion, to which a vehicle rear portion structure relating to a present embodiment is applied, is viewed from the vehicle transverse direction (a cross-sectional view showing the state cut along line 1-1 of FIG. 6)

Further, a peripheral edge portion 18C at the vehicle front side of the rear floor panel 18 is joined by joining means such as welding or the like to the peripheral edge portion at the vehicle rear side of a center floor panel 22 that structures the vehicle longitudinal direction central portion at the floor portion 16. Moreover, as shown in FIG. 1 as well, a bulging portion 18D, that bulges-out toward the vehicle upper side as seen in a vertical cross-section, is formed at the rear floor panel 18 further toward the vehicle rear side than the portion where the rear floor panel 18 and the center floor panel 22 are joined. A closed cross-sectional portion that extends in the vehicle transverse direction is structured by this bulging portion 18D and a reinforcing panel 24 that is joined to the vehicle lower side of the bulging portion 18D by joining means such as welding or the like. Note that a vehicle seat 26 and a vehicle seat 28, that is wider than the vehicle seat 26, are disposed at the vehicle upper side of the center floor panel 22.

On the other hand, the lower back panel 20 is formed by press-working a steel plate, and extends in the vehicle transverse direction and is disposed such that the plate-thickness direction thereof is the vehicle longitudinal direction. As seen in the vehicle vertical direction, the vehicle transverse direction central portion of this lower back panel 20 is formed in a bow-shape that is convex toward the vehicle rear side, and a bulging portion 20A, that is U-shaped and whose vehicle upper side is open as seen in a vertical cross-section, is provided along the peripheral edge portion at the vehicle upper side of the lower back panel 20. Further, a lower back reinforcement 30 that extends along the bulging portion 20A is disposed at the vehicle rear side of the bulging portion 20A of the lower back panel 20. As shown in FIG. 1 as well, this lower back reinforcement 30 is formed in the shape of a hat whose vehicle rear side is open as seen in a vertical cross-section, and flange portions, that are provided at the peripheral edge portions at the vehicle vertical direction both sides of the lower back reinforcement 30 are joined to the lower back panel 20 by joining means such as welding or the like. Due thereto, at the vehicle upper side peripheral edge portion of the lower back panel 20, a closed cross-sectional portion that extends along this peripheral edge portion is structured by the bulging portion 20A and the lower back reinforcement 30. Further, the lower back panel 20 is disposed along the peripheral edge portion 18B of the rear floor panel 18, and structures the vehicle rear side wall portion of the spare tire house 44. Note that a pair of mounting plate portions 32, that are disposed with an interval therebetween in the vehicle transverse direction and that extend-out toward the vehicle rear side, are provided at the vehicle rear side surface of the bulging portion 20A of the lower back panel 20, and a bumper cover is mounted to these mounting plate portions 32 as will be described later.

Figure 4:
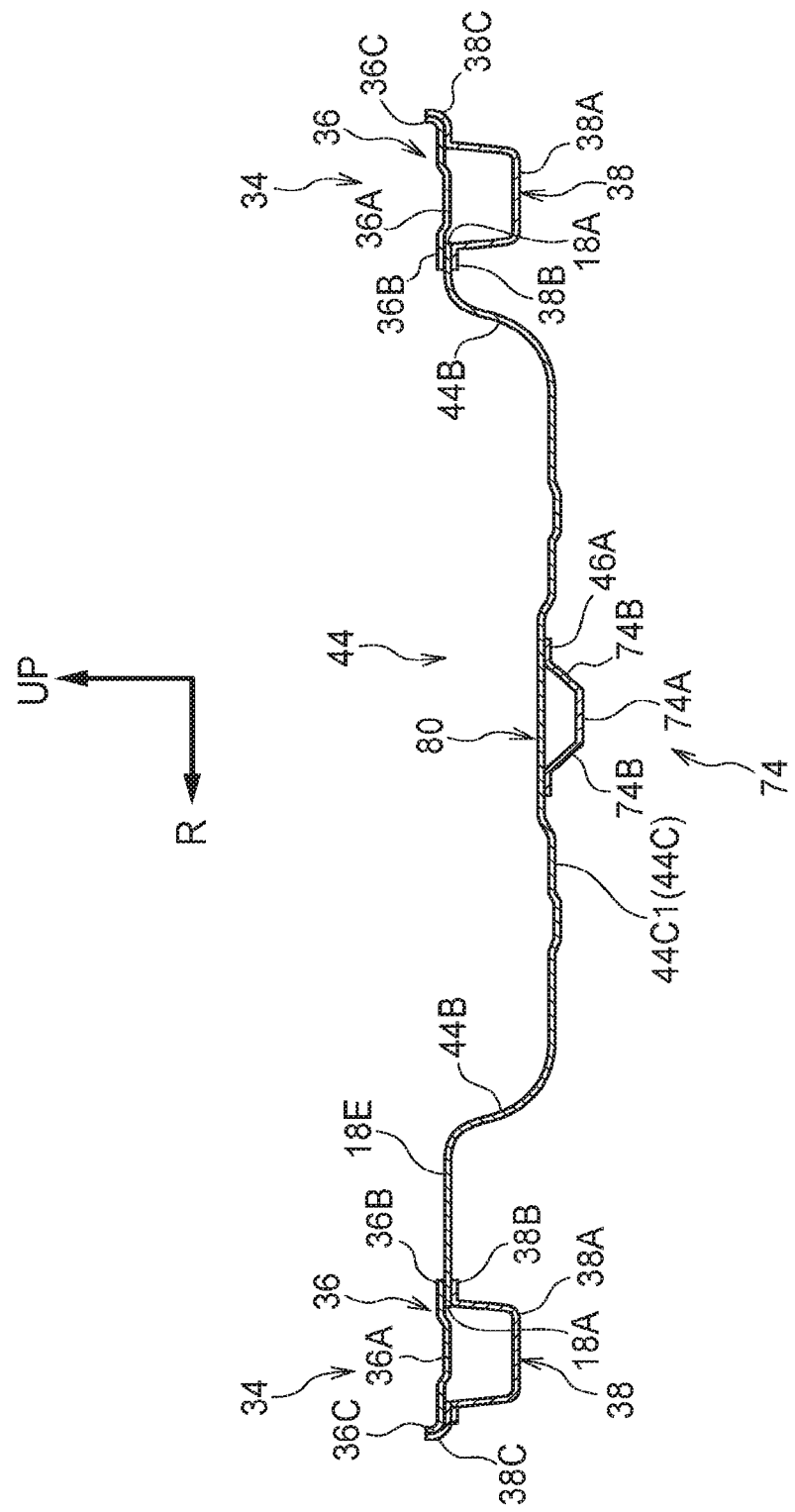
FIG. 4 is a cross-sectional view in which the vehicle rear portion, to which the vehicle rear portion structure relating to the present embodiment is applied, is viewed from the vehicle front side (a cross-sectional view showing the state cut along line 4-4 of FIG. 6)

As shown in FIG. 4 as well, the rear side members 34 are structured to include rear side member uppers 36 that structure the vehicle upper side portions thereof, and rear side member lowers 38 that structure the vehicle lower side portions thereof, and the rear side members 34 are disposed with the length directions thereof being the vehicle longitudinal direction. The rear side member upper 36 is structured to include a base portion 36A that is plate-shaped and whose plate-thickness direction is the vehicle vertical direction, an inner side flange portion 36B that is provided at the vehicle transverse direction inner side of the base portion 36A, and an outer side flange portion 36C that is provided at the vehicle transverse direction outer side of the base portion 36A.

In further detail, although the base portion 36A basically extends uniformly in the vehicle longitudinal direction, a bulging portion 36D, that is U-shaped and whose vehicle lower side is open as seen in a cross-section viewed in the vehicle longitudinal direction, is formed at the portion that is at the vehicle rear side end portion side of the base portion 36A. The bulging portion 36D is structured such that the length direction thereof is the vehicle longitudinal direction, and the width thereof is constant in the vehicle longitudinal direction, and the bulging height thereof gradually becomes higher while heading from an end portion 36D1 at the vehicle front side thereof toward an end portion 36D2 at the vehicle rear side thereof. Further, the inner side flange portion 36B extends rectilinearly from the base portion 36A toward the vehicle transverse direction inner side, and is formed at a predetermined width along the base portion 36A. On the other hand, the outer side flange portion 36C basically extends rectilinearly from the base portion 36A toward the vehicle transverse direction outer side, and is formed at a predetermined width along the base portion 36A, but is bent toward the vehicle upper side at a predetermined section that is further toward the vehicle front side than the end portion 36D1 of the bulging portion 36D.

The length direction of the rear side member lower 38 is the vehicle longitudinal direction. The rear side member lower 38 is structured to include a bulging portion 38A that is plate-shaped and is a U-shape whose cross-sectional shape seen in the vehicle longitudinal direction bulges-out toward the vehicle lower side and whose vehicle upper side is open. Further, an inner side flange portion 38B, that has a similar structure as the inner side flange portion 36B, is provided along the vehicle transverse direction inner side end portion of the bulging portion 38A, and an outer side flange portion 38C, that has a similar structure as the outer side flange portion 36C, is provided along the vehicle transverse direction outer side end portion of the bulging portion 38A.

Further, the outer side flange portion 36C of the rear side member upper 36 and the outer side flange portion 38C of the rear side member lower 38 are joined by joining means such as welding or the like in a state of planarly contacting one another. On the other hand, the inner side flange portion 36B of the rear side member upper 36 and the inner side flange portion 38B of the rear side member lower 38 are joined by joining means such as welding or the like in a state in which the peripheral edge portion 18A at one vehicle transverse direction side of the rear floor panel 18 is interposed therebetween. Concretely, the inner side flange portions 36B, 38B and the peripheral edge portion 18A are joined in a state in which the peripheral edge portion 18A of the rear floor panel 18 is nipped by the inner side flange portion 36B of the rear side member upper 36 and the inner side flange portion 38B of the rear side member lower 38. Namely, the rear side member 34 and the rear floor panel 18 are structured integrally. Further, the rear side member 34 that is structured as described above is made to be a closed cross-sectional structure that extends in the vehicle longitudinal direction and is rectangular frame-shaped as seen in a cross-section viewed in the vehicle longitudinal direction. Note that the vehicle rear side end portions of the rear side members 34 are joined by joining means such as welding or the like to the lower back panel 20.

Returning to FIG. 5, a pair of crash boxes 40, that are disposed apart from one another in the vehicle transverse direction, are provided at the vehicle rear side surface of the lower back panel 20. The crash box 40 is structured to include an impact absorbing portion 40A that is shaped as a quadrangular tube and whose axial direction is the vehicle longitudinal direction, and a mounting portion 40B that extends-out from the vehicle rear side end portion of the impact absorbing portion 40A in a direction orthogonal to that axial direction. The crash box 40 is formed integrally from an aluminum alloy extruded material. Further, the crash box 40 is fixed due to the mounting portion 40B being made to abut the lower back panel 20 and being mounted to the lower back panel 20 by a fastening member such as an unillustrated weld nut or an unillustrated bolt or the like that is provided at the lower back panel 20. Note that the crash boxes 40 are disposed at the vehicle rear sides of the rear side members 34, and more concretely, at positions where the crash boxes 40 and the rear side members 34 overlap as seen in the vehicle longitudinal direction.

Further, a rear bumper reinforcement 42 that extends in the vehicle transverse direction spans between the vehicle rear side end portions (the distal end portions) of the impact absorbing portions 40A of the crash boxes 40. This rear bumper reinforcement 42 is structured to include a rectilinear portion 42A that structures the vehicle transverse direction central portion of the rear bumper reinforcement 42 and extends rectilinearly in the vehicle transverse direction, and bent portions 42B that extend-out toward the vehicle front outer sides from the end portions of the rectilinear portion 42A. In other words, the rear bumper reinforcement 42 is formed in the shape of a bow that is convex toward the vehicle rear side, as seen in the vehicle vertical direction.

More specifically, the rear bumper reinforcement 42 is formed in the shape of an angular tube that is hollow, from an aluminum alloy extruded material. Further, as shown in FIG. 1 as well, a reinforcing rib 43, that is plate-shaped and whose plate thickness direction is the vehicle vertical direction, is provided at the interior of the rear bumper reinforcement 42. Due to the reinforcing rib 43, a front wall portion 42C, that structures the vehicle front side of the rear bumper reinforcement 42, and a rear wall portion 42D, that structures the vehicle rear side of the rear bumper reinforcement 42, are connected at the vehicle vertical direction central portions of these wall portions. Due thereto, the cross-sectional structure of the rear bumper reinforcement 42 is made to be a closed cross-sectional structure in which plural, and specifically two, substantially rectangular closed cross-sections are lined-up in the vehicle vertical direction. Further, the width of the rear bumper reinforcement 42 in the vehicle vertical direction is set to be sufficiently long such that the rear bumper reinforcement 42 covers the vehicle rear side end portion of the rear floor panel 18 and the vehicle rear side end portion of a reinforcing member 46 that is described later, as seen in the vehicle longitudinal direction. Note that the rear bumper reinforcement 42 is mounted to the crash boxes 40 by using fastening means such as unillustrated weld nuts and bolts or the like.

Further, an unillustrated bumper cover that covers the rear bumper reinforcement 42 from the vehicle rear side is disposed at the vehicle rear side of the rear bumper reinforcement 42. This bumper cover is mounted to the mounting plate portions 32 of the lower back panel 20 by mounting means such as clips or the like that also are not illustrated.

Here, the present embodiment has features in the structures of the spare tire house 44 that is provided at the rear floor panel 18 and the reinforcing member 46 that is provided at the vehicle lower side of the spare tire house 44. Examples of the structures of the spare tire house 44 and the reinforcing member 46, that structure main portions of the present embodiment, are described in detail hereinafter.

As shown in FIG. 1 and FIG. 6, the spare tire house 44 is formed as a concave portion that is recessed further toward the vehicle lower side than a general portion 18E of the rear floor panel 18 that is continuous with the peripheral edge portions 18A of the rear floor panel 18 and extends uniformly in the vehicle longitudinal direction and the vehicle transverse direction. Note that the spare tire 68 is not shown in FIG. 6 in order to make the structure of the vehicle body rear portion 14 easy to understand. The spare tire house 44 is a structure that is symmetrical at a vehicle transverse direction one side thereof and the vehicle transverse direction other side thereof. Further, the spare tire house 44 is structured to include a front side peripheral wall portion 44A that structures the vehicle front side thereof, a pair of side wall portions 44B that structure the vehicle transverse direction both sides thereof and extend in the vehicle longitudinal direction, and a bottom wall portion 44C that structures the vehicle lower side thereof.

As seen from the vehicle upper side, the front side peripheral wall portion 44A is formed along a semicircle that is convex toward the vehicle front side and whose center of curvature is slightly further toward the vehicle transverse direction left side than the vehicle transverse direction center of the vehicle 10 and is slightly further toward the vehicle front side than the end portions 36D1 of the bulging portions 36D of the rear side members 34. Further, the vertical sectional shape of the front side peripheral wall portion 44A is a curved shape that is curved in the shape of an arc that is convex toward the vehicle lower side and the outer peripheral side thereof similarly along the peripheral direction thereof.

On the other hand, as seen in the vehicle vertical direction, about 70% of the bottom wall portion 44C from the vehicle front side is made to be an inclined portion 44C1 that is inclined from the vehicle rear upper side toward the vehicle front lower side, and the portion that is further toward the vehicle rear side than this inclined portion 44C1 is made to be a flat portion 44C2 that extends in the vehicle longitudinal direction. Further, the vehicle transverse direction central portion at the vehicle rear side peripheral edge portion of the flat portion 44C2 is made to be an extending portion 44C3 that, as seen in the vehicle vertical direction, is trapezoidal and whose upper bottom side is the vehicle rear side and that becomes narrower toward the vehicle rear side. On the other hand, a concave portion 48 that is concave toward the vehicle rear side is provided at the lower back panel 20 as well so as to correspond to the shape of the extending portion 44C3. The lower back panel 20 is mounted to the rear floor panel 18 due to a flange portion 18F, that is provided so as to extend-out toward the vehicle upper side from the peripheral edge portion 18B of the rear floor panel 18 including the extending portion 44C3, being joined to the lower back panel 20 by joining means such as welding or the like. Note that, as shown in FIG. 7 as well, the side wall portions 44B are formed in substantially triangular shapes that become narrower toward the vehicle rear side, as seen in the vehicle transverse direction.

A clamp bracket 50, that serves as a fixing position where the spare tire 68 is fixed to the bottom wall portion 44C, is provided at the inclined portion 44C1 of the bottom wall portion 44C. As seen from the vehicle upper side, this clamp bracket 50 is disposed in a vicinity of the center of curvature of the front side peripheral wall portion 44A. The clamp bracket 50 is structured to include a bracket portion 52, that is formed from a steel material and is mounted to the inclined portion 44C1 by joining means such as welding or the like, and a weld nut 54. The weld nut 54 is provided at the vehicle lower side surface of an upper wall portion 52A that structures the vehicle upper side portion of the bracket portion 52, and the axial direction of the weld nut 54 is disposed so as to run along a direction heading from the vehicle front upper side toward the vehicle rear lower side. Note that six bead portions 56, that are convex toward the vehicle lower side and that, as seen in the vehicle vertical direction, extend in a radial form that is centered around the clamp bracket 50 and are symmetrical with respect to a vehicle longitudinal direction straight line that passes-through the clamp bracket 50, are formed at the bottom wall portion 44C. Further, a fuel tank 58 is disposed at the vehicle front side of the spare tire house 44 and the vehicle lower side of the center floor panel 22.

On the other hand, a supporting bracket 60 is provided at the bottom wall portion 44C at the vehicle rear side of the clamp bracket 50. This supporting bracket 60 is formed by press-working a steel plate, and is structured to include a supporting portion 60A that bulges-out toward the vehicle upper side, and a flange portion 60B that is provided along the vehicle lower side end portion of the supporting portion 60A and extends in the vehicle longitudinal direction. Further, a supporting wall portion 60A1 that structures the vehicle upper side of the supporting portion 60A is inclined from the vehicle rear upper side toward the vehicle front lower side, in the same way as the inclined portion 44C1 of the bottom wall portion 44C. The supporting bracket 60 is mounted to the bottom wall portion 44C in a state of spanning over the inclined portion 44C1 and the flat portion 44C2 of the bottom wall portion 44C, due to the flange portion 60B being joined to the bottom wall portion 44C by joining means such as welding or the like.

At the spare tire house 44 that is structured as described above, the spare tire 68 is placed on the bottom wall portion 44C of the spare tire house 44, and is accommodated in a state of being fixed by a clamp bolt 62 and the clamp bracket 50. In detail, the clamp bolt 62 is structured to include a bolt portion 64 that is cylindrical and is formed of metal and at whose surface a screw groove is provided, and a grip portion 66 that is made of resin and is provided at one end portion of the bolt portion 64. This clamp bolt 62 is screwed-together with the weld nut 54 of the clamp bracket 50 due to the bolt portion 64 of the clamp bolt 62 being inserted from the vehicle upper side through an insert-through portion 71, that is formed in the center of a disc portion 70 of the spare tire 68, and the grip portion 66 being turned by hand. Further, due to the grip portion 66 being turned until the grip portion 66 pushes the disc portion 70, the disc portion 70 is pushed-against the bottom wall portion 44C side of the spare tire house 44, and the clamp bolt 62 can fix the spare tire 68.

Further, in the state in which the spare tire 68 is fixed, the axial direction of the bolt portion 64 of the clamp bolt 62 is a direction heading from the vehicle front upper side toward the vehicle rear lower side. Moreover, the vehicle rear side portion of a tire portion 72 of the spare tire 68 is placed on the supporting wall portion 60A1 of the supporting bracket 60, and the vehicle front side portion of the tire portion 72 is in a state of being placed on the inclined portion 44C1 of the bottom wall portion 44C. Therefore, in the fixed state, the spare tire 68 is disposed in an inclined state in which the vehicle rear side portion of the tire portion 72 is disposed further toward the vehicle upper side than the vehicle front side portion of the tire portion 72. Note that the clamp bolt 62 is structured such that, when force of a predetermined magnitude or greater is applied to the grip portion 66, the grip portion 66 is separated from the bolt portion 64.

Further, in the present embodiment, the rear floor panel 18 and the rear side members 34 are structured such that the distribution of rigidity (rigidity distribution) in the vehicle vertical direction of the portion of the vehicle body rear portion 14, which portion is structured by the rear floor panel 18 and the rear side members 34, is uniform in the vehicle longitudinal direction. Note that what is called the rigidity distribution in the vehicle vertical direction here means the rigidity with respect to bending whose axis is the vehicle transverse direction.

Figure 2:
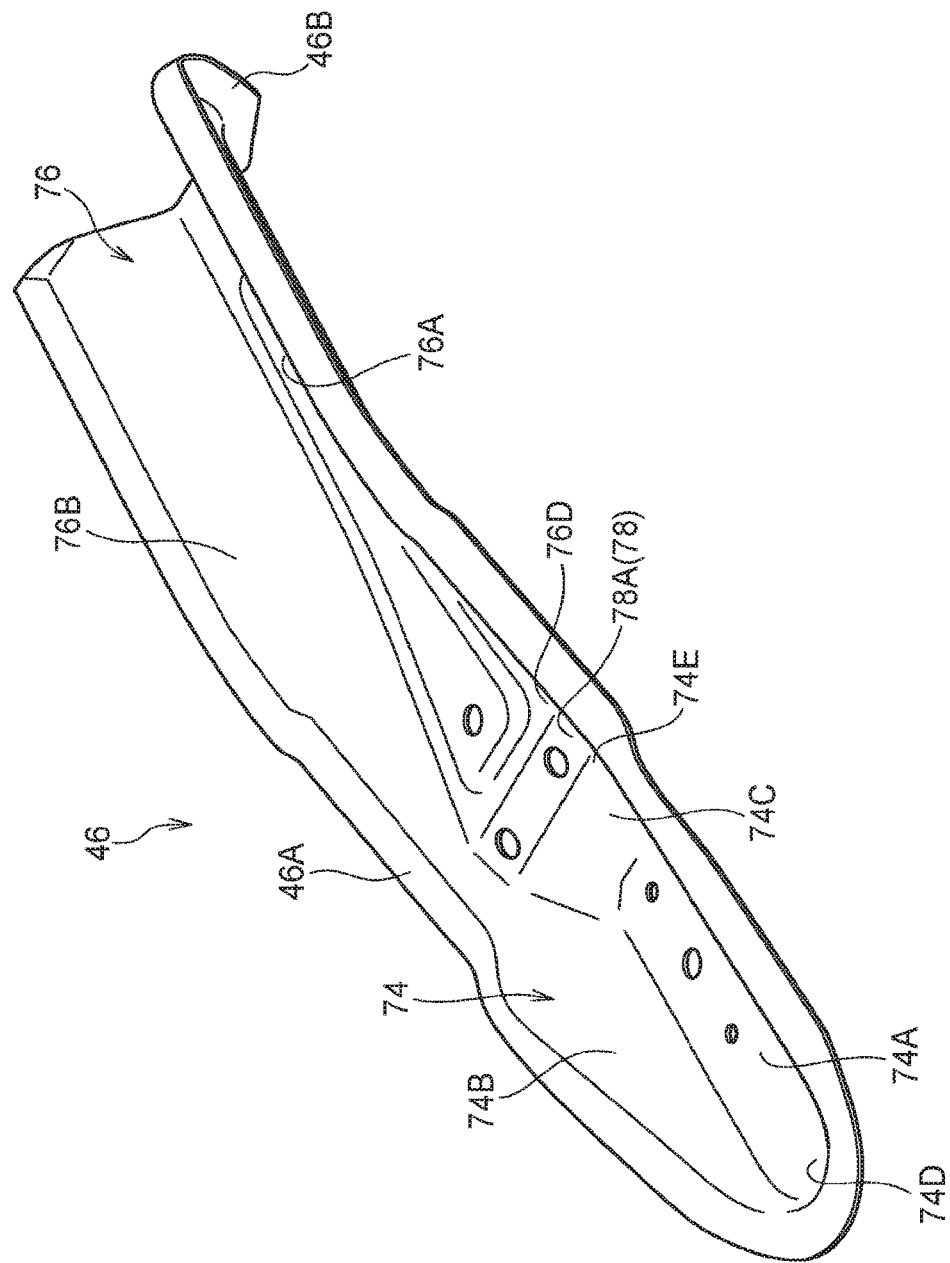
FIG. 2 is a perspective view showing the structure of a reinforcing member that structures the vehicle rear portion to which the vehicle rear portion structure relating to the present embodiment is applied.

The structure of the reinforcing member 46 is described next mainly by using FIG. 2 and FIG. 5. This reinforcing member 46 is formed by press-working a steel plate, and is structured to include a front side reinforcing portion 74 that structures the vehicle front side thereof, a rear side reinforcing portion 76 that structures the vehicle rear side thereof, and a weak portion 78 that connects the front side reinforcing portion 74 and the rear side reinforcing portion 76. Further, overall, the reinforcing member 46 extends in the vehicle longitudinal direction, and, as seen in the vehicle vertical direction, is disposed such that the central line in the length direction thereof and the central line in the vehicle longitudinal direction of the spare tire house 44 overlap one another.

The front side reinforcing portion 74 is formed as a bulging portion that bulges-out toward the vehicle lower side, and, as shown in FIG. 1 as well, is disposed at the vehicle lower side surface of the inclined portion 44C1 of the spare tire house 44. This front side reinforcing portion 74 is structured to include a lower wall portion 74A that structures the vehicle lower side thereof, a pair of side wall portions 74B that structure the vehicle transverse direction both sides thereof, and a rear wall portion 74C that structures the vehicle rear side thereof. In detail, as seen in the vehicle vertical direction, the lower wall portion 74A is formed in a rectangular shape that extends in the vehicle longitudinal direction, and is disposed such that the vehicle front side portion thereof overlaps the clamp bracket 50. Further, as shown in FIG. 4 and FIG. 7 as well, the side wall portions 74B extend-out from the vehicle transverse direction outer side peripheral edge portions of the lower wall portion 74A so as to be inclined toward the vehicle upper side while heading toward the vehicle transverse direction outer sides. Moreover, the vehicle upper side peripheral edge portions of the side wall portions 74B are formed so as to run along the inclined portion 44C1 of the spare tire house 44, and, as seen in the vehicle transverse direction, the side wall portions 74B are formed in triangular shapes that become wider toward the vehicle rear side. On the other hand, the rear wall portion 74C rises-up toward the vehicle rear upper side from the vehicle rear side peripheral edge portion of the lower wall portion 74A, and covers the vehicle rear sides of the lower wall portion 74A and the side wall portions 74B. Namely, the front side reinforcing portion 74 is structured such that, from an end portion 74D at the vehicle front side thereof to the vehicle rear side peripheral edge portion of the lower wall portion 74A, the cross-sectional secondary moment, whose axis is the vehicle transverse direction of a cross-section that is cut in the vehicle transverse direction thereof, increases. Further, the front side reinforcing portion 74 is structured such that, from the vehicle rear side peripheral edge portion of the lower wall portion 74A to an end portion 74E at the vehicle rear side thereof (the peripheral edge portion at the vehicle rear side of the rear wall portion 74C), the cross-sectional secondary moment, whose axis is the vehicle transverse direction of a cross-section that is cut in the vehicle transverse direction thereof, decreases.

Returning to FIG. 1, the rear side reinforcing portion 76 is formed as a bulging portion that bulges-out toward the vehicle lower side, and is disposed so as to span over the inclined portion 44C1 and the flat portion 44C2 of the spare tire house 44. As shown in FIG. 2 as well, this rear side reinforcing portion 76 is structured to include a lower wall portion 76A that structures the vehicle lower side thereof, and a pair of side wall portions 76B that structure the vehicle transverse direction both sides thereof, and the vehicle rear side thereof is open. In detail, as seen in the vehicle vertical direction, the lower wall portion 76A is formed in a rectangular shape that extends in the vehicle longitudinal direction, and a bulging-portion that bulges-out toward the vehicle upper side is formed along the length direction central line thereof. Further, the side wall portions 76B extend-out from the vehicle transverse direction outer side peripheral edge portions of the lower wall portion 76A so as to be inclined toward the vehicle upper side while heading toward the vehicle transverse direction outer sides, in the same way as the side wall portions 74B of the front side reinforcing portion 74. Moreover, as shown in FIG. 7 as well, the peripheral edge portions at the vehicle upper sides and the vehicle front sides of the side wall portions 76B are formed so as to run along the inclined portion 44C1 of the spare tire house 44. Further, the peripheral edge portions at the vehicle upper sides and the vehicle rear sides of the side wall portions 76B are formed so as to run along the flat portion 44C2 of the spare tire house 44. Namely, as seen in the vehicle transverse direction, the side wall portions 76B are formed in trapezoidal shapes in which the vehicle upper sides of the side wall portions 76B are the upper bottom sides, and the widths thereof widen from the vehicle front side end portions thereof to the boundary portion of the inclined portion 44C1 and the flat portion 44C2 of the spare tire house 44, and the portions thereof that are at the vehicle rear sides of this boundary portion are a constant width.

The rear side reinforcing portion 76 that is formed as described above is structured such that, at the section thereof where the widths of the side wall portions 76B widen, the cross-sectional secondary moment whose axis is the vehicle transverse direction of the cross-section cut along the vehicle transverse direction thereof increases, and, at the section where the widths of the side wall portions 76B are constant, that cross-sectional secondary moment is constant. Further, the rear side reinforcing portion 76 extends from the flat portion 44C2, that is at the vehicle rear side of the inclined portion 44C1 of the spare tire house 44, to the vehicle rear side end portion of the extending portion 44C3 at the flat portion 44C2, i.e., to a vehicle rear side end portion 44D of the spare tire house 44. Moreover, the rear side reinforcing portion 76 is disposed at the vehicle rear upper side of the front side reinforcing portion 74, and the positional relationship between the front side reinforcing portion 74 and the rear side reinforcing portion 76 is set such that the both do not overlap one another as seen in the vehicle vertical direction, the vehicle transverse direction and the vehicle longitudinal direction. In addition, the above-described rear bumper reinforcement 42 is disposed at the vehicle rear side of the rear side reinforcing portion 76. In other words, as seen in the vehicle longitudinal direction, the rear side reinforcing portion 76 is disposed so as to overlap the rear bumper reinforcement 42. Still further, as shown in FIG. 5, an end portion 76C at the vehicle rear side of the rear side reinforcing portion 76 is positioned further toward the vehicle rear side than the vehicle rear side end portions 34A of the rear side members 34.

Returning to FIG. 1, the weak portion 78 connects the end portion 74E of the front side reinforcing portion 74 and an end portion 76D at the vehicle front side of the rear side reinforcing portion 76, at the vehicle rear side of the clamp bracket 50 and at the vehicle front side of the boundary portion between the inclined portion 44C1 and the flat portion 44C2 of the spare tire house 44. As shown in FIG. 2 as well, this weak portion 78 is structured mainly by a connecting wall portion 78A whose length direction is the vehicle transverse direction and that bridges the vehicle rear side end portion of the rear wall portion 74C of the front side reinforcing portion 74 and the vehicle front side end portion of the lower wall portion 76A of the rear side reinforcing portion 76. Further, although side wall portions are formed at the vehicle transverse direction both sides of the connecting wall portion 78A, the connecting wall portion 78A and the inclined portion 44C1 are separated from one another only by a slight distance. Therefore, the cross-sectional secondary moment, whose axis is the vehicle transverse direction of a cross-section in which the weak portion 78 is cut in the vehicle transverse direction, is a magnitude that is the same as or less than the cross-sectional secondary moment whose axis is the vehicle transverse direction of a cross-section in which the end portion 74E of the front side reinforcing portion 74 is cut in the vehicle transverse direction. Similarly, the cross-sectional secondary moment, whose axis is the vehicle transverse direction of a cross-section in which the weak portion 78 is cut in the vehicle transverse direction, is a magnitude that is the same as or less than the cross-sectional secondary moment whose axis is the vehicle transverse direction of a cross-section in which the end portion 76D of the rear side reinforcing portion 76 is cut in the vehicle transverse direction. Accordingly, the reinforcing member 46 alone is structured such that, when load is applied to the vehicle rear side end portion thereof in a state in which the vehicle front side end portion thereof is supported, the reinforcing member 46 bends with the weak portion 78 being the starting point.

Note that a flange portion 46A, that extends-out toward the outer side from the inner sides of the front side reinforcing portion 74, the rear side reinforcing portion 76 and the weak portion 78, is provided at the reinforcing member 46 along the peripheral edge portion at the vehicle upper side thereof. Further, a flange portion 46B, whose plate thickness direction is the vehicle longitudinal direction, is provided along the vehicle rear side end portion of the reinforcing member 46. Moreover, the reinforcing member 46 is mounted integrally to the spare tire house 44 and the lower back panel 20 due to the flange portion 46A being joined to the bottom wall portion 44C of the spare tire house 44 and the flange portion 46B being joined to the lower back panel 20, respectively by joining means such as welding or the like.

Here, in the present embodiment, a first high rigidity portion 80, a second high rigidity portion 82 and a low rigidity portion 84 are set due to the reinforcing member 46, that is structured as described above, being mounted to the bottom wall portion 44C of the spare tire house 44.

In detail, as shown in FIG. 4, the front side reinforcing portion 74 of the reinforcing member 46, together with the bottom wall portion 44C, forms a closed cross-section that is trapezoidal as seen in a cross-section cut in the vehicle transverse direction, and the first high rigidity portion 80 is structured by the front side reinforcing portion 74 and the bottom wall portion 44C. The central portion of the bottom wall portion 44C is reinforced due to this first high rigidity portion 80 being structured.

Further, although not illustrated, the rear side reinforcing portion 76 of the reinforcing member 46, together with the bottom wall portion 44C, also forms a closed cross-section that is trapezoidal as seen in a cross-section cut in the vehicle transverse direction, and the second high rigidity portion 82 is structured by the rear side reinforcing portion 76 and the bottom wall portion 44C. The portion, that is further toward the vehicle rear side than the central portion, of the bottom wall portion 44C is reinforced due to this second high rigidity portion 82 being structured. Further, the low rigidity portion 84, whose rigidity is set to be lower than those of the first high rigidity portion 80 and the second high rigidity portion 82, is structured between the first high rigidity portion 80 and the second high rigidity portion 82 by the weak portion 78 of the reinforcing member 46 and the bottom wall portion 44C. Note that, as shown in FIG. 1, the positional relationship between the first high rigidity portion 80 and the second high rigidity portion 82 is set such that the second high rigidity portion 82 is disposed at the vehicle rear upper side with respect to the first high rigidity portion 80. Further, the positional relationship between the low rigidity portion 84 and the clamp bracket 50 is set such that the low rigidity portion 84 is disposed at the vehicle rear side of the clamp bracket 50.

(Operation and Effects of Present Embodiment)

Operation and effects of the present embodiment are described next.

In the present embodiment, as shown in FIG. 1, the spare tire house 44 is formed at the rear floor panel 18 that structures the vehicle body rear portion 14, and the spare tire 68 is accommodated in this spare tire house 44. Therefore, when collision load F is inputted to the vehicle rear portion 12 due to a collision of a collision body from the vehicle rear side (a rear collision), or the like, this collision load F is transmitted to the spare tire 68 via the spare tire house 44 that is formed at the rear floor panel 18.

In detail, at the vehicle body rear portion 14, the collision load F is first inputted to the rear bumper reinforcement 42. Due to the rear bumper reinforcement 42 receiving the collision load F and deforming from a bow shape into a rectilinear shape that extends in the vehicle transverse direction, the collision load F is absorbed. Further, in a case in which the collision load F cannot be completely absorbed by the deformation of the rear bumper reinforcement 42, the lower back panel 20 also is pushed and deformed by the collision load F, and the collision load F is transmitted to the rear floor panel 18 side.

By the way, when the collision load F that is inputted to the vehicle rear portion 12 is large, the rear floor panel 18 deforms, and, accompanying the deformation of the rear floor panel 18, the spare tire house 44 also deforms. It is thought that, due to the spare tire house 44 deforming, the spare tire 68 moves toward the vehicle front side.

Here, in the present embodiment, the front side reinforcing portion 74 and the rear side reinforcing portion 76 are provided at the bottom wall portion 44C of the spare tire house 44, and the first high rigidity portion 80 is structured due to the bottom wall portion 44C being reinforced by the front side reinforcing portion 74. Further, the second high rigidity portion 82 is structured due to the bottom wall portion 44C being reinforced by the rear side reinforcing portion 76. Moreover, the low rigidity portion 84, whose rigidity is set to be lower than those of the first high rigidity portion 80 and the second high rigidity portion 82, is provided between the first high rigidity portion 80 and the second high rigidity portion 82. Therefore, when the collision load F from the rear side is inputted to the spare tire house 44, the second high rigidity portion 82 and the peripheral portion of the second high rigidity portion 82 at the spare tire house 44 are pushed toward the vehicle front side while the shapes thereof are substantially maintained. Further, the spare tire house 44 bendingly deforms with the low rigidity portion 84, that is provided between the first high rigidity portion 80 and the second high rigidity portion 82, being the starting point.

By the way, it is thought that, when the first high rigidity portion 80 and the second high rigidity portion 82 are disposed rectilinearly along the vehicle longitudinal direction, the direction of the bending deformation of the spare tire house 44 is not stable. Concretely, it is thought that the deformation of the spare tire house 44 is affected by the vehicle vertical direction load component, that is included in the collision load F that is inputted to the vehicle rear portion 12, and becomes unstable. Here, in the present embodiment, the rear side reinforcing portion 76 is structured to include the lower wall portion 76A that extends along the vehicle longitudinal direction, and the rear side reinforcing portion 76 is disposed at the vehicle rear upper side of the front side reinforcing portion 74, and the second high rigidity portion 82 is structured at the vehicle rear upper side of the first high rigidity portion 80. Therefore, due to the vehicle longitudinal direction component of the collision load F from the vehicle rear side, the second high rigidity portion 82 is pushed toward the vehicle front side, and the first high rigidity portion 80 pivots in a direction of rising-up toward the vehicle front side.

Figure 3:
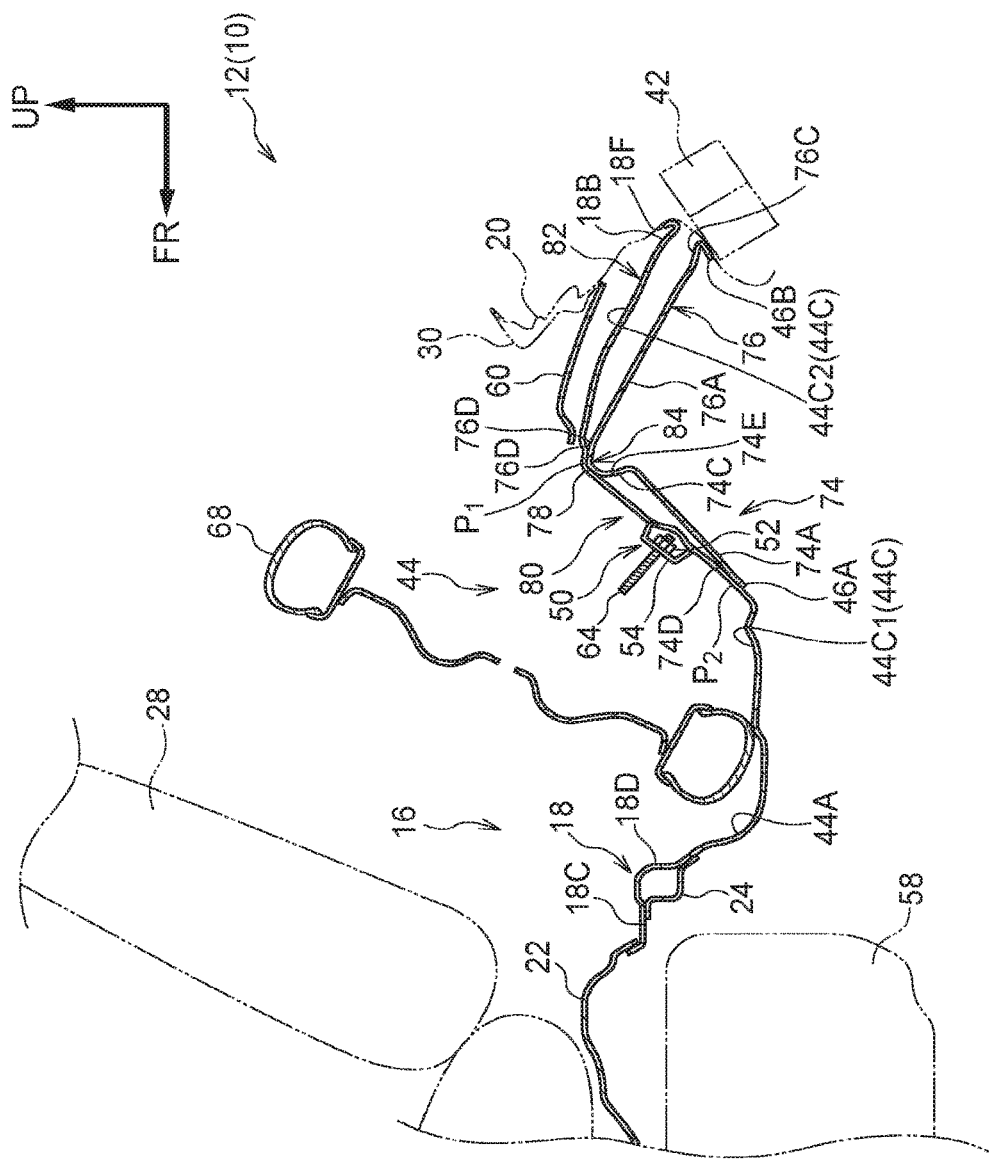
FIG. 3 is a cross-sectional view showing a state, after input of collision load, of the vehicle rear portion to which the vehicle rear portion structure relating to the present embodiment is applied (a cross-sectional view corresponding to the state cut along line 1-1 of FIG. 6)

More concretely, as shown in FIG. 3, the portion, that is further toward the vehicle rear side than the low rigidity portion 84 at the vehicle body rear portion 14 and at which the second high rigidity portion 82 is structured, pivots clockwise with the low rigidity portion 84 being first bending point P$_1$, as seen from the vehicle transverse direction left side. On the other hand, the portion, that is further toward the vehicle front side than the low rigidity portion 84 at the vehicle body rear portion 14 and at which the first high rigidity portion 80 is structured, is pushed by the portion, that is further toward the vehicle rear side than the low rigidity portion 84, at the vehicle body rear portion 14. Further, the portion, that is further toward the vehicle front side than the low rigidity portion 84, at the vehicle body rear portion 14 pivots counterclockwise with the vehicle front side end portion of the first high rigidity portion 80 being second bending point P$_2$, as seen from the vehicle transverse direction left side.

As a result, even if a vehicle vertical direction load component is included in the collision load F that is inputted to the vehicle rear portion 12, the spare tire house 44 bendingly deforms so as to become convex toward the vehicle upper side, with the low rigidity portion 84 being the apex. Further, due to the spare tire house 44 bendingly deforming, the grip portion 66 of the clamp bolt 62 separates from the bolt portion 64, and the fixed state of the spare tire 68 is released, and the spare tire 68 is thrown up. Accordingly, in the present embodiment, at the time of input of the collision load F to the vehicle rear portion 12, the spare tire 68 can be stably thrown up, and accordingly, the spare tire 68 moving toward the vehicle front side, i.e., the fuel tank 58 side, can be suppressed. Moreover, due to the spare tire house 44 deforming due to the collision load F as described above, the spare tire house 44 moving toward the vehicle front side also can be suppressed, regardless of whether or not the spare tire 68 is accommodated in the spare tire house 44. Namely, in the present embodiment, at the time of input of the collision load F to the vehicle rear portion 12, transmission of load toward the vehicle front side by the spare tire house 44 and the spare tire 68 can be suppressed.

Further, in the present embodiment, the rear side reinforcing portion 76 extends to the vehicle rear side end portion 44D of the spare tire house 44. Further, the vehicle rear side end portion 76C of the rear side reinforcing portion 76 is positioned further toward the vehicle rear side than the vehicle rear side end portions 34A of the rear side members 34 that extend along the peripheral edge portions at the vehicle transverse direction both sides of the rear floor panel 18. Therefore, at the time of input of the collision load F from the vehicle rear side, the spare tire house 44 can bendingly deform before the rear side members 34 deform.

To describe more concretely, due to the rear bumper reinforcement 42 receiving the collision load F and deforming rectilinearly, first, the vehicle transverse direction central portion of the lower back panel 20 is pushed by the rectilinear portion 42A of the rear bumper reinforcement 42 and deforms. Then, the collision load F is inputted from the rear bumper reinforcement 42 directly to the vehicle rear side end portions at the impact absorbing portions 40A of the crash boxes 40, and the collision load F is inputted via the lower back panel 20 to the vehicle rear side end portion 76C of the rear side reinforcing portion 76. As a result, the impact absorbing portions 40A crushingly deform, and the reinforcing member 46 bendingly deforms, and thereafter, the rear side members 34 deform by being pushed by the residual collapsing of the impact absorbing portions 40A. Accordingly, in the present embodiment, even if the length of the rear side members 34 of the vehicle 10 cannot be ensured, the spare tire 68 can be thrown up without being affected by the deformation of the vehicle body rear portion 14. Moreover, because the deformation mode of the spare tire house 44, and accordingly of the rear floor panel 18, is determined by the bending deformation of the reinforcing member 46, the deformation mode of the vehicle body rear portion 14 including the rear side members 34 can be stabilized.

Moreover, in the present embodiment, because the rear bumper reinforcement 42 is disposed at the vehicle rear side of the rear side reinforcing portion 76, the efficiency of transmitting the collision load F, that is from the vehicle rear side, to the rear side reinforcing portion 76 can be improved. As a result, in the present embodiment, the time required from the input of the collision load F from the vehicle rear side until the throwing-up of the spare tire 68 can be shortened.

In addition, in the present embodiment, because the low rigidity portion 84 is disposed at the vehicle rear side of the clamp bracket 50, the starting point of the deformation of the spare tire house 44 is further toward the vehicle rear side than the fixed position of the spare tire 68. Therefore, as shown in FIG. 3, at the time of input of the collision load F from the vehicle rear side, the spare tire 68 is in a tilted state in which the vehicle rear side portion thereof is disposed further toward the vehicle upper side than the vehicle front side portion thereof. Further, at this time, because the peripheral portion of the first high rigidity portion 80 at the spare tire house 44 pivots in the direction of rising-up toward the vehicle front side, load, that causes the spare tire 68 to pivot in the direction of rising-up toward the vehicle front side, is applied from this peripheral portion to the spare tire 68. As a result, in the present embodiment, by making the tilted direction of the spare tire 68 be directed toward the vehicle lower side, the spare tire 68 being displaced toward the vehicle obliquely front upper side can be suppressed. Further, the time required until the spare tire 68 is thrown up can be shortened as compared with a case in which the low rigidity portion 84 is disposed at the vehicle front side of the clamp bracket 50.

<Supplementary Description of the Above-Described Embodiment>

(1) In the above-described embodiment, the single reinforcing member 46 is disposed at the spare tire house 44 along the vehicle longitudinal direction central line, but plural reinforcing members may be disposed at the spare tire house 44. As an example, there may be a structure in which two of the reinforcing members 46 are disposed at the spare tire house 44 so as to be symmetrical with respect to the vehicle longitudinal direction central line.

(2) Further, although the above-described embodiment is structured such that the reinforcing member 46 includes the front side reinforcing portion 74, the rear side reinforcing portion 76 and the weak portion 78, embodiments are not limited to this. As an example, the reinforcing member 46 may be made to be a structure that is divided into a front side reinforcing member, that corresponds to the front side reinforcing portion 74, and a rear side reinforcing member, that corresponds to the rear side reinforcing portion 76. In this case, the portion, that is between the front side reinforcing member and the rear side reinforcing member, at the bottom wall portion 44C functions as the low rigidity portion 84.

(3) Further, in the above-described embodiment, the reinforcing member 46 and the spare tire house 44 are structured by separate bodies, but these may be structured by one member. As an example, there may be a structure in which a front side bulging portion that corresponds to the front side reinforcing portion 74 and a rear side bulging portion that corresponds to the rear side reinforcing portion 76 are provided integrally by press-working or the like at the bottom wall portion 44C of the spare tire house 44. In this case, the front side bulging portion functions as the first high rigidity portion 80, the rear side bulging portion functions as the second high rigidity portion 82, and the portion between the front side bulging portion and the rear side bulging portion at the bottom wall portion 44C functions as the low rigidity portion 84.

(4) Further, although the low rigidity portion 84 is disposed at the vehicle rear side of the clamp bracket 50 in the above-described embodiment, there may be a structure in which the low rigidity portion 84 is disposed at the vehicle front side of the clamp bracket 50. Even with such a structure, at the time of input of the collision load F from the vehicle rear side, the spare tire 68 can be thrown up even though the spare tire 68 pivots so as to rise-up toward the vehicle rear side.

(5) Further, the above-described embodiment is structured such that the vehicle rear side end portion 76C of the rear side reinforcing portion 76 is positioned further toward the vehicle rear side than the vehicle rear side end portions 34A of the rear side members 34, but embodiments are not limited to this. As an example, the end portion 76C of the rear side reinforcing portion 76 and the end portions 34A of the rear side members 34 may be disposed at the same position in the vehicle longitudinal direction. Even in such a structure, there is no change with regard to the fact that the spare tire house 44 bendingly deforms with the low rigidity portion 84 being the starting point, and therefore, the spare tire 68 can be thrown up at the time of input of the collision load F from the vehicle rear side.

In addition, in the above-described embodiment, the lower wall portion 76A of the rear side reinforcing portion 76 is formed in a rectangular shape that extends in the vehicle longitudinal direction, as seen in the vehicle vertical direction. However, embodiments are not limited to this. As an example, the lower wall portion may extend in the vehicle longitudinal direction, and may be structured in the shape of a bent plate that is V-shaped and is convex toward the vehicle lower side as seen in a cross-section seen in the vehicle longitudinal direction. Note that the lower wall portion 76A extending in the vehicle longitudinal direction also includes a state of being inclined in the vehicle vertical direction, within a scope in which the operation and effects of the present embodiment are exhibited. Further, the shape of the side wall portions 76B of the rear side reinforcing portion 76 as seen in the vehicle transverse direction also is not limited to trapezoidal, and may be triangular. Moreover, in the same way as the rear side reinforcing portion 76, the front side reinforcing portion 74 also can be changed into various shapes within a scope in which the operation and effects of the present embodiment are exhibited.

What is claimed is:

1. A vehicle rear portion structure comprising:
   a spare tire house, the spare tire house being formed at a rear floor panel structuring a vehicle body rear portion, and in the spare tire house a spare tire being accommodated;
   a front side reinforcing portion, the front side reinforcing portion being provided at a bottom wall portion of the spare tire house, the front side reinforcing portion reinforcing the bottom wall portion, and the front side reinforcing portion structuring a first high rigidity portion;
   a rear side reinforcing portion, the rear side reinforcing portion being provided at the bottom wall portion so as to include a lower wall portion that extends in a vehicle longitudinal direction, the rear side reinforcing portion being disposed at a vehicle rear upper side of the front side reinforcing portion, the rear side reinforcing portion reinforcing the bottom wall portion, and the rear side reinforcing portion structuring a second high rigidity portion; and
   a low rigidity portion, the low rigidity portion being provided between the first high rigidity portion and the second high rigidity portion, and a rigidity of the low rigidity portion being set to be lower than rigidities of the first high rigidity portion and the second high rigidity portion,
   wherein a rear bumper reinforcement that extends in a vehicle transverse direction is disposed at a vehicle rear side of the rear side reinforcing portion, at a position that overlaps the rear side reinforcing portion as seen in the vehicle longitudinal direction.

2. The vehicle rear portion structure of claim 1, wherein the rear side reinforcing portion extends to a vehicle rear side end portion of the spare tire house, and a vehicle rear side end portion of the rear side reinforcing portion is positioned further toward a vehicle rear side than vehicle rear side end portions of rear side members that extend along peripheral edge portions in a vehicle transverse direction at both sides of the rear floor panel.

3. The vehicle rear portion structure of claim 1, wherein the low rigidity portion is disposed at a vehicle rear side of a fixed position where the spare tire is fixed to the bottom wall portion.

* * * * *